United States Patent [19]

Singh et al.

[11] Patent Number: 4,659,379

[45] Date of Patent: Apr. 21, 1987

[54] NICKEL ANODE ELECTRODE

[75] Inventors: Prabhakar Singh, Bethel; Mark Benedict, Monroe, both of Conn.

[73] Assignee: Energy Research Corporation, Danbury, Conn.

[21] Appl. No.: 723,665

[22] Filed: Apr. 16, 1985

[51] Int. Cl.$^4$ ............................................. C22C 29/12
[52] U.S. Cl. ....................................... 75/234; 75/232; 75/235; 75/951; 264/104; 419/2; 419/19; 419/20; 419/23; 419/27; 419/30; 419/33; 419/35; 419/38; 419/58
[58] Field of Search ................. 75/951, 232, 235, 234; 419/2, 19, 20, 23, 27, 30, 33, 35, 38, 58; 264/104

[56] References Cited

U.S. PATENT DOCUMENTS 4,077,816 3/1978 Nadkarni ............................... 419/19
4,247,604 1/1981 Marianowski et al. ............... 429/40

Primary Examiner—Stephen J. Lechert, Jr.
Attorney, Agent, or Firm—John J. Torrente

[57] ABSTRACT

A nickel anode electrode fabricated by oxidizing a nickel alloying material to produce a material whose exterior contains nickel oxide and whose interior contains nickel metal throughout which is dispersed the oxide of the alloying material and by reducing and sintering the oxidized material to form a product having a nickel metal exterior and an interior containing nickel metal throughout which is dispersed the oxide of the alloying material.

23 Claims, 4 Drawing Figures

NICKEL ANODE ELECTRODE

BACKGROUND OF THE INVENTION

This invention relates to anode electrodes and, in particular, to nickel anode electrodes and to methods for making same.

Nickel anode electrodes for molten carbonate fuel cells have suffered in the past from creep and structural stability effects as well as from lack of resistance to sintering during prolonged fuel cell use. The presence of the latter effects, in turn, leads to other undesirable consequences. Thus, the anode structure is found to exhibit changes in its pore spectrum and increased contact resistance with attendant loss of electrical contact. Additionally, the anode structure is found to manifest electrolyte migration due to overlapping pore formation. This, in turn, causes electrolyte creep and wetting of the catalyst.

A variety of attempts have been made to reduce electrode creepage and increase sintering resistance in an effort to reduce or eliminate the above effects. In one such attempt, lithium aluminate has been physically and chemically impregnated into the nickel electrode structure. This technique, however, has not provided satisfactory results; since the ceramic particles incorporated into the structure stay at the metallic surface only and do not act as sites for inhibiting dislocation movements.

Another attempt at reducing electrode creepage and increasing sintering resistance has centered around the use of nickel chromium alloy to provide $Cr_2O_3$ dispersoids in the electrode structure. Electrodes made in this way have evidenced some short term improvement, but over the long term, the alloy evidences accelerated creep and physical changes due to an unstable internal structure formed by the $Cr_2O_3$ dispersoids in the nickel metal matrix. While higher chromium levels have resulted in satisfactory creep strength, the formation of an outer growing $Cr_2O_3$ layer at the expense of the internal oxide dispersoids causes electrolyte wetting and preferential loss of oxides near the gas/metal surface.

Another attempt at reducing creepage and increasing sintering resistance of the anode electrode has been to use nickel aluminum alloys to form an electrode structure stabilized by $Al_2O_3$ dispersoids. Work in this direction has, however, been very limited due to the difficulties in initial sintering of the nickel aluminum powders.

Researchers have also used metal coated ceramic particles for anode fabrication. The sintering behavior and creep resistance of such structures, however, has not been reported.

Anode structures prepared by the prior techniques have thus not proven satisfactory for one reason or another. It is therefore an object of the present invention to provide a nickel anode structure which evidences less creepage, improved structural stability and increased sintering resistance during use.

SUMMARY OF THE INVENTION

In accordance with the principles of the present invention, the above and other objectives are realized in a practice where a nickel alloy material is subjected to an oxidation treatment under controlled conditions. In particular, these conditions are such as to cause the interior of the material to comprise a nickel metal throughout which is dispersed an oxide of the alloying material. The conditions are also such as to cause the exterior of the material to comprise a nickel oxide layer of a predetermined thickness, preferably equal to or less than about five micrometers.

The oxidized material so formed is then reduced to convert the nickel oxide outer layer to nickel metal. By also sintering the material during the reduction process, a sintered porous anode component is formed having nickel in its exterior and in its interior a metallic nickel matrix throughout which is dispersed an oxide of the alloying material. With this type of configuration for the electrode, the electrode is found to exhibit reduced creepage and increased resistance to sintering during use.

In one embodiment of the invention to be disclosed hereinafter, the oxidation treatement comprises a single oxidation step which results in both the nickel oxide exterior and the nickel metal interior with dispersed alloying oxide. In a second embodiment, the oxidation treatment comprises a first oxidation step, a particle break-up step and a second oxidation step. In this case, the first oxidation step produces both in the interior and exterior of the material a nickel metal having dispersed therethrough an oxide of the alloying material. The second step causes a reduction in the particle size of the oxidized material and the final or second oxidation step converts the exterior of the material to nickel oxide.

Also, in a further aspect of the invention, the electrode resulting from the reduction/sintering process is lithiated under controlled conditions so as to avoid unwanted carbonate electrolyte loss during cell use.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
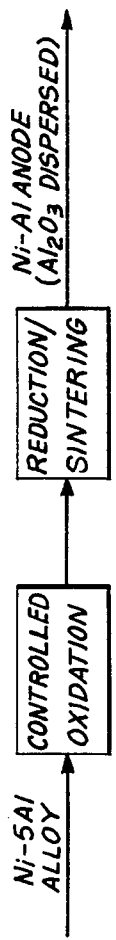
FIGS. 1 and 2 show flow diagrams of first and second embodiments of a method for fabricating a nickel anode electrode in accordance with the principles of the present invention.
Figure 2:
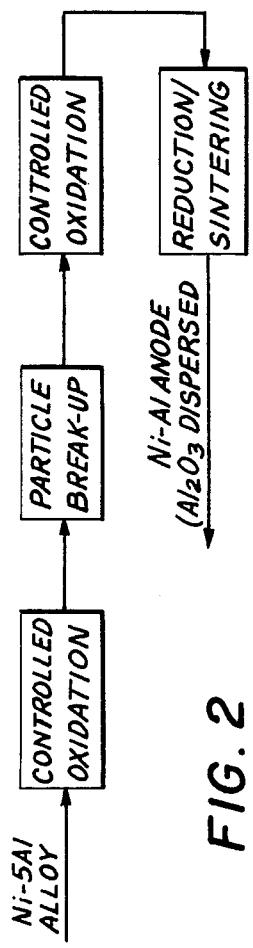

In accordance with the invention, nickel anodes are prepared by the method illustrated in the flow diagrams of FIGS. 1 and 2. A nickel alloy material containing about one to five weight percent alloying material is used for anode fabrication. The alloying material is preferably one which upon oxidation will provide highly stable oxides in the interior of the anode. Suitable alloying materials are aluminum, yttrium, magnesium, titanium, tantalum, molybdenum and cerium. For the purposes of the present application, the alloy wll be assumed to be a Ni-Al alloy powder, and, in particular, a Ni-5Al powder.

After consolidation of the Ni-5Al particles, the particles are subjected to a controlled oxidation treatment. This treatment differs in the FIG. 1 and FIG. 2 embodiments of the invention, as will be discussed at length hereinbelow. However, in both embodiments, the treatments result in particles having an outer layer, which may be total or partial, of nickel oxide of predetermined thickness and an interior comprised of nickel metal having dispersed therethrough Al$_2$O$_3$.

Figure 3:
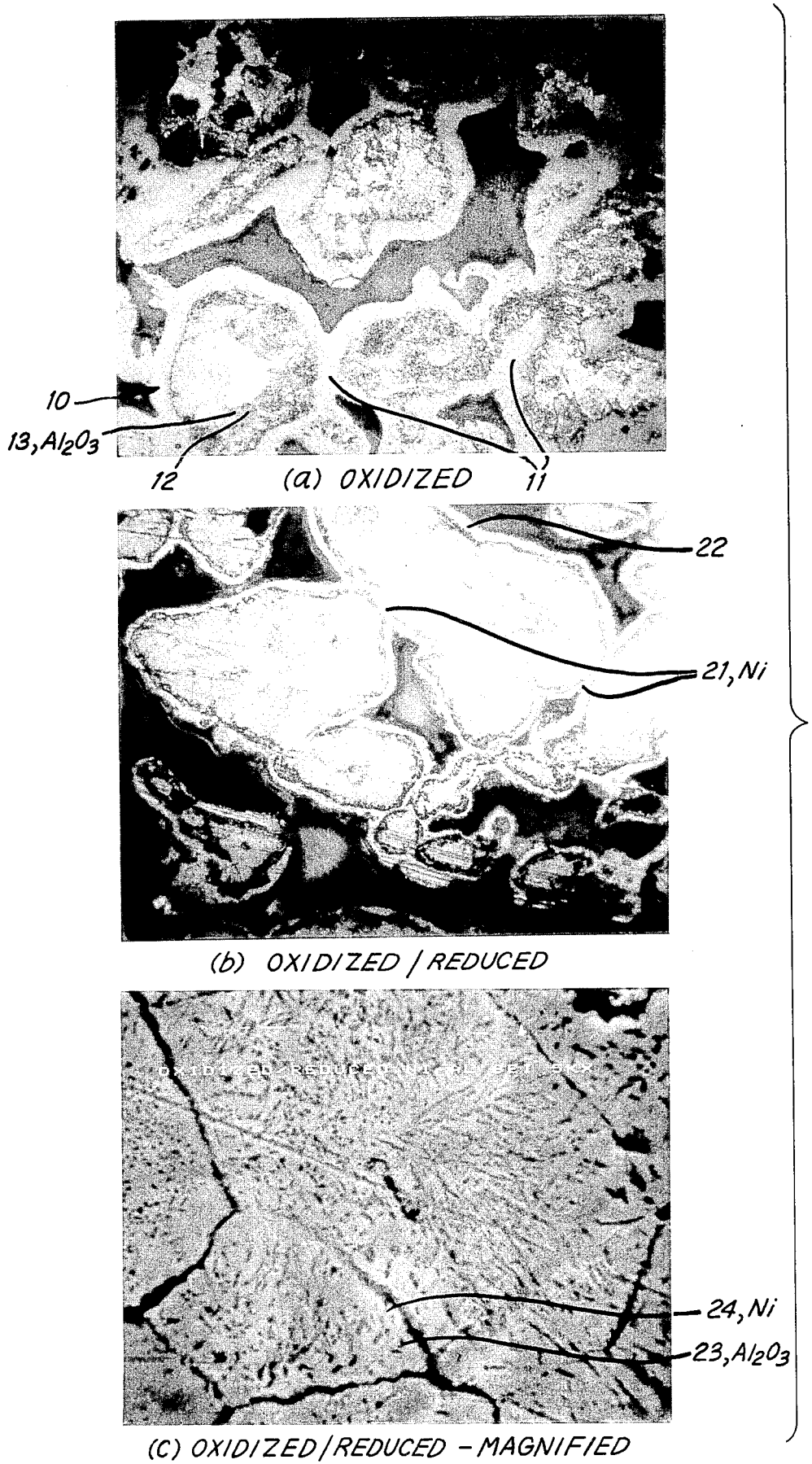
FIG. 3 portrays the effects of the methods of FIGS. 1 and 2 on the nickel alloy particles being processed.

FIG. 3 shows in (a) an optical microscope photograph of nickel aluminum particles 10 after the oxidation treatment. As illustrated, the particles in their exteriors contain a NiO layer 11 and in their interiors a nickel metal 12 throughout which is homogeneously dispersed the Al$_2$O$_3$ precipitates 13.

Selection of the particular oxidation conditions utilized in the oxidation treatment for a particular case will depend, in part, upon the thickness of the NiO skin desired in the oxidized product. The latter, in turn, will depend upon the thickness needed to permit sintering during formation of the electrode while still achieving required strength. It has been found that a thickness equal to or less than about five micrometers allows proper sintering and provides good strength. In a particular situation, however, the optimum conditions for achieving the desired thickness can be empirically determined.

After oxidation treatment, the Ni-5Al particles are subjected to a reduction process also under controlled conditions. Preferably, prior to the reduction process, the particles are compacted into a cohesive porous membrane or unitary structure either by conventional compression in a mold or by conventional liquid tape casting. The resultant compact may typically be 30 to 60 mils thick, and 50 to 60 percent porous. Thinner compacts are usable to form flat electrode membranes, while thicker compacts are usable to form corrugated electrode membranes. Although formation of the compact is preferably carried out after oxidation, formation prior to oxidation is also possible.

The reducton of the compact is furthermore carried out in a manner which simultaneously results in sintering of the compact. More particularly, the compact is subjected to a hydrogen atmosphere under preselected pressure and temperature conditions. These conditions are such that the NiO outer layer of each particle is reduced to metallic nickel which covers all or part of the particle surface. As a result, the particles take on a partial or full nickel exterior and the latter promotes the sintering process which also occurs as a result of the heat and pressure being applied. Preferable conditions for the reduction/sintering are a temperature in the range of about 600 to 1,000 degrees centigrade and a period of time from about one-half to two hours.

In (b) of FIG. 3 joined particles resulting from the reduction and sintering are shown. As illustrated, a strong neck area 21 is formed between the resultant reduced Ni outer layers 22 of the two particles. The interiors of the particles, in turn, still contain Al$_2$O$_3$ particles 23 homogeneously dispersed within the nickel metal 24 as displayed in the higher magnification scanning electron microscope photograph of FIG. 3(c).

The resultant anode structure thus contains nickel metal either as an outer layer or as a partial covering, and an interior composed of Al$_2$O$_3$ finely dispersed within a nickel matrix. The anode structure so formed has been found to exhibit superior strength and resistance against physical creepage during use. This is believed, in part, attributable to the interior homogeneous in-situ precipiatated submicron size Al$_2$O$_3$ particles which are highly effective in pinning the dislocation movements which occur as a result of sintering during use.

Additionally, sintering during the reduction phase is more readily enabled by the Ni at the outer surfaces. This nickel covering also provides the resultant anode with a non-wettable surface and thus one less susceptible to electrolyte creep.

As shown, the oxidation treatment in the embodiment of FIG. 1 comprises a single oxidation step during which both the formation of the NiO outer layer and the inner nickel metal with dispersed Al$_2$O$_3$ occurs. The conditions of this treatment are such that internal Al$_2$O$_3$ precipitates are formed as oxygen diffuses into the Ni-Al alloy particles and oxidizes the aluminum. The conditions are also such that either simultaneously with or subsequent to the oxidation of the aluminum, nickel diffuses out of the particles to combine with oxygen to form a NiO outer layer or skin. The result is, as mentioned above and shown in (a) of FIG. 3, nickel particles with a NiO outer layer and a nickel metal interior with Al$_2$O$_3$ dispersed therethrough.

The above single oxidation step is preferably carried out at a temperature within the range of 700-1,000 degrees centigrade for a time from about 1 to 10 hours. If the atmosphere used is air or pure oxygen only, the oxidation of the aluminum and nickel will occur simultaneously. If, however, the atmosphere is intially a water vapor/hydrogen mixture, possibly diluted with nitrogen or a carbon dioxide/carbon monoxide mixture, and this initial atmosphere is followed by an atmosphere of air or pure oxygen only, the oxidation of the aluminum can be made to occur and be completed first and subsequently the oxidation of the nickel will occur. An example of conditions resulting in the latter, is use of an initial atmosphere containing water vapor and hydrogen having a ratio of partial pressures of about 100 for about 10 hours at 950 degrees centigrade, followed by an atmosphere of pure oxygen for about 10 to 30 minutes. An example of the simultaneous case, on the other hand, is use of an air atmosphere for about three hours at a temperature of 900 degrees centigrade.

In the embodiment of the invention shown in FIG. 2, the oxidation treatment comprises two oxidation steps separated by a particle diminution or break-up step. This treatment results in an anode structure of smaller mean pore size than the treatment in FIG. 1 and is preferable in cases where a small mean pore size is desired.

In this case, the initial oxidation conditions are such that internal oxidation of the aluminum in the particles occurs first. In particular, aluminum oxide is precipated as small sub-micron Al$_2$O$_3$ dispersoids with larger concentrations of the dispersoids being present at the particle grain boundaries owing to the larger concentrations of aluminum. The initial conditions are also such that no oxidation of the nickel takes place. Thus, this oxidation step results in a nickel metal matrix throughout which aluminum oxide dispersoids are homogeneously distributed, with a larger concentration of dispersoids at the particle grain boundaries.

Following the initial oxidation, the resultant particles are fractured at the grain boundaries by a particle diminution or break-up step which is typically accomplished by milling. This process subjects the particles to extreme stresses causing fracture primarily at the grain boundaries where an excess of the aluminum oxide dispersoids have introduced considerable internal stresses.

After milling, the reduced in size particles are now subjected to a second controlled oxidation step. In this step the conditions are such that nickel diffuses out of the particles and combines with oxygen to form the desired NiO outer layer or skin.

A consequence of the aforesaid nickel oxide formation at the surface of the particles is the exfoliation of any residual $Al_2O_3$ accumulations that existed at the grain boundaries and that are now at the surfaces of the smaller particles. An $Al_2O_3$ surface layer would greatly hinder the subsequent sintering of the particles, but the growth of the nickel oxide layer from below serves the dual purpose of spalling off the $Al_2O_3$ and providing for an easily sinterable material upon reduction.

The conditions in the first oxidation step and the second oxidation step of the FIG. 2 embodiment are like those for the FIG. 1 oxidation treatment where that treatment is carried out serially, i.e., where the aluminum is first oxidized completedly and then the nickel is oxidized. In particular, the first step has conditions like those present in the aluminum oxidation portion of the serially carried out FIG. 1 oxidation treatment and the second step conditions like those present in the nickel oxidation portion of such serial FIG. 1 oxidation treatment.

Figure 4:
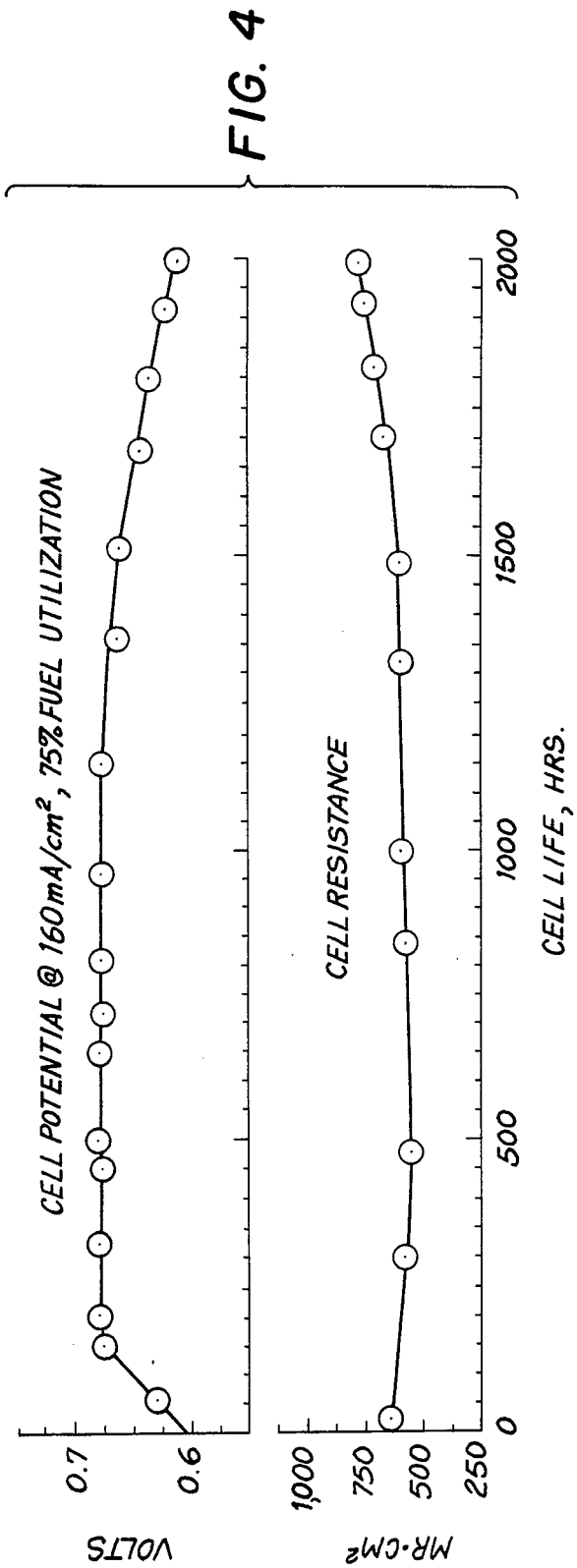
FIG. 4 shows graphically the voltage and resistance plotted against hours of usage of a molten carbonate fuel cell employing a nickel anode fabricated in accordance with the invention.

Accelerated creep tests have been performed on anodes made in accordance with the invention and have confirmed their superior strength. Thus, anodes of the invention crept less than one percent under conditions where ceramic impregnated nickel anodes crept 20 percent and NiCr anodes crept approximately 3-5 percent. Cell testing has also confirmed dimensional stability of the nickel anodes and electrochemical performance close to state-of-the-art has been observed. In this regard, FIG. 4 shows the voltage and resistance plotted against hours of operation of a molten carbonate fuel cell employing an anode constructed in accordance with the invention. As can be seen, the cell provided a 712 mv output at a current density of 160 mA/cm² a 75 percent fuel utilization and a 50 percent oxidant utilization.

It should be noted that the oxidation of the nickel alloy of the latter cell was carried out at a temperature of about 900 degrees centigrade which resulted in substantially complete oxidation of the aluminum to $Al_2O_3$. Such complete oxidation is believed preferable, although less than complete oxidation at lower temperatures results in a usable anode, but one whose resistance characteristic is higher and voltage is lower than in the complete oxidation case.

It should also be noted that the pore size of the resultant anode is dependent upon the size of the nickel alloy particles being processed. Commercially made Ni-5Al, particles have been found to be large, and typically result in a mean pore size for the anode of between 20-25 micrometers. If smaller pore sizes are desired, the process of FIG. 2 whereby milling of the particles after oxidation of the aluminum only can be followed. A pore size for the anode between 5 to 6 micrometers is preferable and this can be realized by milling the particles to a size of 3 to 10 micrometers.

Another technique for providing reduced pore size in the anode structure is to impregnate the structure after sintering with fine ceramic particles such as, for example, $LiAlO_2$. This will not alter the conductivity or activity of the electrode, but will provide the desired pore size reduction, as well as increased wettability and electrolyte retention during use.

In a futher aspect of the present invention, the anode structure as formed above is further treated by a lithiation process so that use of the anode in a molten carbonate fuel cell does not cause loss of molten carbonate electrolyte. More particularly, it has been found that the $Al_2O_3$ dispersoids in the anode structure react with the lithium in the lithium carbonate/potassium carbonate electrolyte melt. This results in the conversion of some or all of the $Al_2O_3$ dispersoids to $LiAlO_2$. Commensureate with the $Al_2O_3$ to $LiAlO_2$ conversion the ratio of lithium to potassium cations in the carbonate electrolyte melt decreases.

In accordance with this aspect of the invention, these effects are prevented by a lithiation treatment applied to the anode electrode prior to its use. This process adds sufficient lithium to the anode to enable the subsequent $Al_2O_3$ to $LiAlO_2$ conversion to occur without affecting the electrolyte cation balance.

More particularly, this lithiation procedure is carried out by precipitation of stoichiometric to 20 percent excess quantities of lithim salt, such as lithium hydroxide, onto the surface of the nickel particles of the anode. The anode is then subjected to heat treatment to promote reaction conversion of $Al_2O_3$ to $LiAlO_2$. Heat treatment is accomplished in a reducing atmosphere containing at least 3 percent hydrogen and at a temperature of greater than 730 degrees centigrade. The atmosphere should also be entirely free of carbon dioxide.

Heat treatment times for the lithiation can be quite lengthy, or short, depending upon the degree of conversion required. All or some conversion may take place during the heat treatment but regardless of the extent, the lithium content is available for future conversion in the fuel cell.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention. Thus, for example, while the sintering of the compact was described as occurring simultaneously with the reduction procedure, it may also be carried out after the reduction procedure is completed. Furthermore, formation of the particles into a compact may occur after reduction, if sintering is also performed after reduction. Also, it should be noted that the oxidation treatment and the subsequent reduction and sintering procedure can be carried out in a common furnace by suitable control of the atmospheric and heating conditions to produce the desired treatments.

What is claimed is:

1. A method of producing a nickel anode electrode comprising the steps of:
   oxidizing a nickel alloy material in particle form to produce in its exterior nickel oxide and in its interior nickel metal throughout which is dispersed an oxide of the alloying material;
   compacting said nickel alloy particles to form a porous cohesive structure,
   and simultaneously reducing and sintering said compact of said oxidized nickel alloy material to produce nickel metal in the material exterior, whereby a sintered porous anode component is formed having nickel metal in its exterior and in its interior nickel metal throughout which is dispersed an oxide of the alloying material.

2. A method in accordance with claim 1 wherein:
   said oxidation is carried out in an atmosphere containing oxygen at a temperature in a range from about 700, to 1,000 degrees centigrade;

and said reduction is carried out in an atmosphere containing hydrogen and/or carbon monoxide at a temperature in a range of 600 to 1,000 degrees centigrade.

3. A method in accordance with claim 2 wherein:
said oxidation is carried out over a period of time in the range from about one to ten hours;
and said reduction in carried out over a period of time in the range from one-half to two hours.

4. A method in accordance with claim 1 wherein:
said alloying material is selected form the group consisting of aluminum, yttrium, magnesium, titanium, tantalum, molybdenum and cerium.

5. A method in accordance with claim 1 wherein:
said compacting occurs one of: before said oxidizing; and after said oxidizing and before said reduction.

6. A method in accordance with claim 1 wherein:
the size of said particles is in the range of 3 to 10 micrometers at the time of reduction.

7. A method in accordance with claim 1 further comprising:
impregnating the material with ceramic particles after reduction.

8. A method in accordance with claim 7 wherein:
said ceramic is $LiAlO_2$.

9. A method in accordance with claim 1 wherein:
said oxidation results in an oxide of said alloying material being uniformly dispersed throughout said nickel metal interior.

10. A method in accordance with claim 1 wherein:
said step of oxidizing is under conditions wherein oxidation of nickel and oxidation of the alloying material occur simultaneously.

11. A method in accordance with claim 1 wherein:
said oxidizing step is carried out under conditions wherein said alloying material is first oxidized to completion and thereafter said nickel is oxidized.

12. A method in accordance with claim 1 wherein:
said oxidizing step includes:
a first oxidation under conditions which cause oxidation of said alloying material only;
a second oxidation subsequent to said first oxidation under conditions to cause oxidation of said nickel;
and said method further includes:
subjecting said material after said first oxidation and prior to said second oxidation to a material dimunition step.

13. A method in accordance with claim 12 wherein:
said dimunition steps includes milling said material.

14. A method in accordance with claim 1 wherein:
the nickel oxide exterior comprises a layer of thickness equal to or less than about 5 micrometers.

15. A method in accordance with claim 14 wherein:
said layer is a partial layer.

16. A method in accordance with claim 1 further comprising:
precipitating a lithium salt onto said sintered material;
heating said material after said precipation.

17. An anode electrode made by the method of claim 1.

18. An anode electrode made by the method of claim 3.

19. An anode electrode made by the method of claim 4.

20. An anode electrode made by the method of claim 10.

21. An anode electrode made by the method of claim 11.

22. An anode electrode made by the method of claim 12.

23. An anode electrode made by the method of claim 14.

* * * * *